US006936082B2

United States Patent
Primdahl (12)

(10) Patent No.: US 6,936,082 B2
(45) Date of Patent: Aug. 30, 2005

(54) VERY LARGE AUTOTHERMAL REFORMER

(75) Inventor: Ivar I. Primdahl, Copenhagen (DK)

(73) Assignee: Haldor Topsoe A/S, Lyngby (DK)

( * ) Notice: Subject to any disclaimer, the term of this patent is extended or adjusted under 35 U.S.C. 154(b) by 563 days.

(21) Appl. No.: 09/982,857

(22) Filed: Oct. 22, 2001

(65) Prior Publication Data

US 2003/0075482 A1 Apr. 24, 2003

(51) Int. Cl.[7] .................................................. B01J 8/04
(52) U.S. Cl. ..................... 48/197 R; 48/127.9; 422/188
(58) Field of Search .............................. 48/61, 62 R, 89, 48/118.5, 127.9, 197 R, 198.1, 215, 214 A; 422/188, 189, 198, 211

(56) References Cited

U.S. PATENT DOCUMENTS

| 4,588,659 | A | * | 5/1986 | Abens et al. ................. 429/20 |
| 4,935,037 | A | * | 6/1990 | Koyama et al. ............... 48/94 |
| 4,946,667 | A | * | 8/1990 | Beshty ..................... 423/648.1 |
| 5,470,360 | A | * | 11/1995 | Sederquist ..................... 48/94 |
| 5,632,787 | A | * | 5/1997 | Boucot et al. ................. 48/61 |
| 5,938,800 | A | * | 8/1999 | Verrill et al. ............... 48/127.9 |

* cited by examiner

Primary Examiner—Kevin P. Kerns
(74) Attorney, Agent, or Firm—Dickstein Shapiro Morin & Oshinsky LLP

(57) ABSTRACT

An autothermal reforming process and apparatus including a combustion chamber, at least one catalytic reactor, a duct for leading combustion product from the combustion chamber to the catalytic reactor or reactors, and withdrawal ducts for withdrawing the product of the catalytic reactor or reactors.

4 Claims, 1 Drawing Sheet

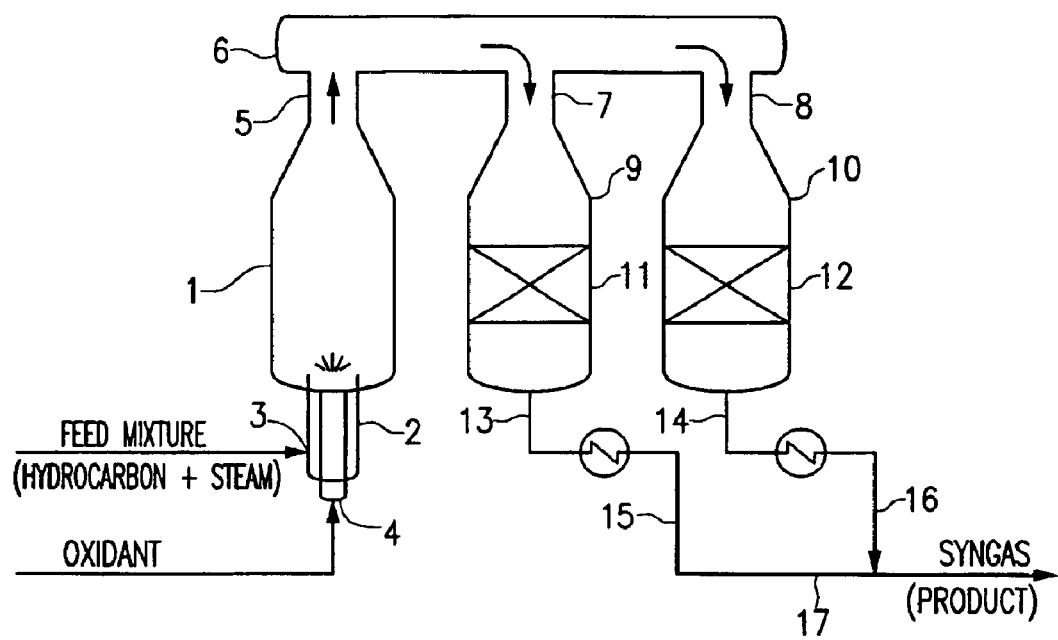

VERY LARGE AUTOTHERMAL REFORMER

BACKGROUND OF THE INVENTION

An existing design for an autothermal reforming apparatus consists of a refractory lined, cylindrical vessel with a conical top part where the burner is installed in the top of the cone. The vessel is in principle divided into two zones, the top part being used as a flame chamber where combustion takes place and where also a high velocity swirling back-mix ensures an even temperature and composition at the inlet to the next zone where the filling of reforming catalyst takes care of equilibration of the reforming gas mixture.

This design is limited in capacity, mainly by two factors:

a. The refractory lined reactor can only be built up to a certain maximum diameter (maximum regarded to be for the moment approximately 7 m).

b. If the catalyst bed does not have enough flow area, the pressure drop over the catalyst bed will lead to risk of gas passing through the refractory lining or even behind the lining so that the pressure shell is overheated and damaged. (There are numerous examples from the industry that such a risk is real.)

SUMMARY OF THE INVENTION

The object of this invention is to provide a catalytic autothermal reactor which involves the following elements:

1. A combustion chamber which is empty and located inside the refractory lining of a vessel of similar shape as the one described above. The process burner through which the feed fluids are entering is mounted in the bottom of this combustion chamber and the mixed combustion products are leaving the top of the combustion chamber from where they are distributed to the following reactor(s).

2. One or more catalytic reforming reactors which are supplied with combustion product from the combustion chamber. The design of the catalytic reactor resembles the original design and by having more than one reactor, the capacity can be increased by a factor of 2 or 3 or more by having a sufficient number of such reactors connected to the combustion chamber where each reactor still respects the maximum allowable diameter.

BRIEF DESCRIPTION OF THE DRAWING

Appended hereto is a drawing, the sole FIGURE of which schematically illustrates the preferred embodiments of the apparatus and process of this invention.

DESCRIPTION OF PREFERRED EMBODIMENTS

Referring to the drawing FIGURE, there is provided a combustion chamber (1) having a burner (2) in the bottom thereof, provided with inlets (3) and (4) for introducing a hydrocarbon and steam feed mixture and oxidant, respectively, the combustion chamber (1) is open at the top (5) to a duct (6) which is provided with openings (7) and (8) for introducing the combustion products into catalytic reforming reactors (9) and (10) having catalyst beds (11) and (12). the catalytic reactors (9) and (10) are provided with outlets (13) and (14) respectively at the bottoms thereof for the reformed product (syngas). the reformed product (i.e., the reformate) is withdrawn via ducts (15) and (16), respectively, which communicate with a withdrawal duct (17).

The following example is illustrative of the process employing the apparatus of this invention.

EXAMPLE

| | |
|---|---:|
| Process gas flow entering into the burner, $Nm^3/h$ | 800,000 |
| Steam flow mixed into the feed flow, $Nm^3/h$ | 480,000 |
| Temperature of the mixed feed stream, °C. | 600 |
| Pressure, bar | 35 |
| Oxygen flow to burner, $Nm^3/h$ 480,000 at 300° C. and 35 bar | |
| Temperature in the combustion chamber (reactor 1), °C. | 1320 |
| Temperature at the exit of catalytic reactor reactor 2), °C. | 1050 |
| Number of catalytic reactors: | 4 |
| each with an internal diameter of | 6–7 m |

Besides obtaining the option to choose the plant capacity independent of the reactor diameter limitation, the present invention also makes it possible to supply the catalyst bed with gas which is arriving at a much lower linear velocity than what is otherwise necessary to obtain a good mixing, this because the mixing is now already obtained in the combustion chamber before the gas is distributed to the catalytic reactors. This reduces dramatically the risk of disturbances of the catalyst bed top layer.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An autothermal reforming apparatus comprising:

(a) a combustion chamber;

(b) at least two catalytic reactors connected in parallel to the combustion chamber;

(c) a duct for leading combustion product from the combustion chamber in parallel to the catalytic reactors, wherein the combustion product directly contacts and heats catalyst beds within the catalytic reactors; and (d) withdrawal ducts for withdrawing the product of the catalytic reactors.

2. An autothermal reforming apparatus according to claim 1, wherein said combustion chamber is provided in the bottom thereof with a burner having inlets for feed and oxidant.

3. An autothermal reforming apparatus according to claim 1, wherein said combustion chamber is provided in the top thereof for outlet means communicating with said duct.

4. An autothermal reforming process comprising combusting in a combustion chamber, a hydrocarbon and steam feed with an oxidant to produce a combustion product, withdrawing the combustion product, introducing it to at least two reactors connected in parallel to the combustion chamber, wherein the combustion product directly contacts and heats catalyst beds within the reactors, catalytically reforming the combustion product in the reactors to produce a reformate, and withdrawing the reformate.

* * * * *